United States Patent [19]

Lemoine

[11] 3,749,832

[45] July 31, 1973

[54] BINARY CODED SIGNAL AND CIPHERING AND DECIPHERING METHOD AND SYSTEMS EMBODYING SAME

[75] Inventor: Jean H. Lemoine, Le Vesinet, France

[73] Assignee: Compagnie Internationale Pour L'Informatique, Louveciennes, France

[22] Filed: Apr. 13, 1964

[21] Appl. No.: 359,066

[30] Foreign Application Priority Data

Apr. 12, 1963 France ............................ 63931560

[52] U.S. Cl. ..................................... 178/22, 178/26

[51] Int. Cl. .............................................. H04l 9/00

[58] Field of Search ........................ 178/22, 26, 26.5

[56] References Cited

UNITED STATES PATENTS 3,229,037 1/1966 Sturzinger ............................ 178/22

*Primary Examiner*—Benjamin A. Borchelt
*Assistant Examiner*—Birmiel
*Attorney*—Kemon, Palmer, Stewart and Estabrook

[57] ABSTRACT

For avoiding the transmission of coded servicing signals on a transmission path between transmitting and receiving ends of a binary coded ciphered signal syste, each ciphered signal is formed, at the transmitting end, by first ciphering, in the sequence of the plain alphabet signals, a number of successive intelligence periods lower than the lower number of such period in any plain signal, and thereafter completing said lower number of ciphered periods up to said normal number by adding at least one additional intervening arbitrary period distinguishing the thus built up signal from any servicing signal pattern in the system. The additional arbitrary periods are canceled at the receiving end and the uncanceled periods are regrouped for normal deciphering operations.

6 Claims, 2 Drawing Figures

Figure 1:
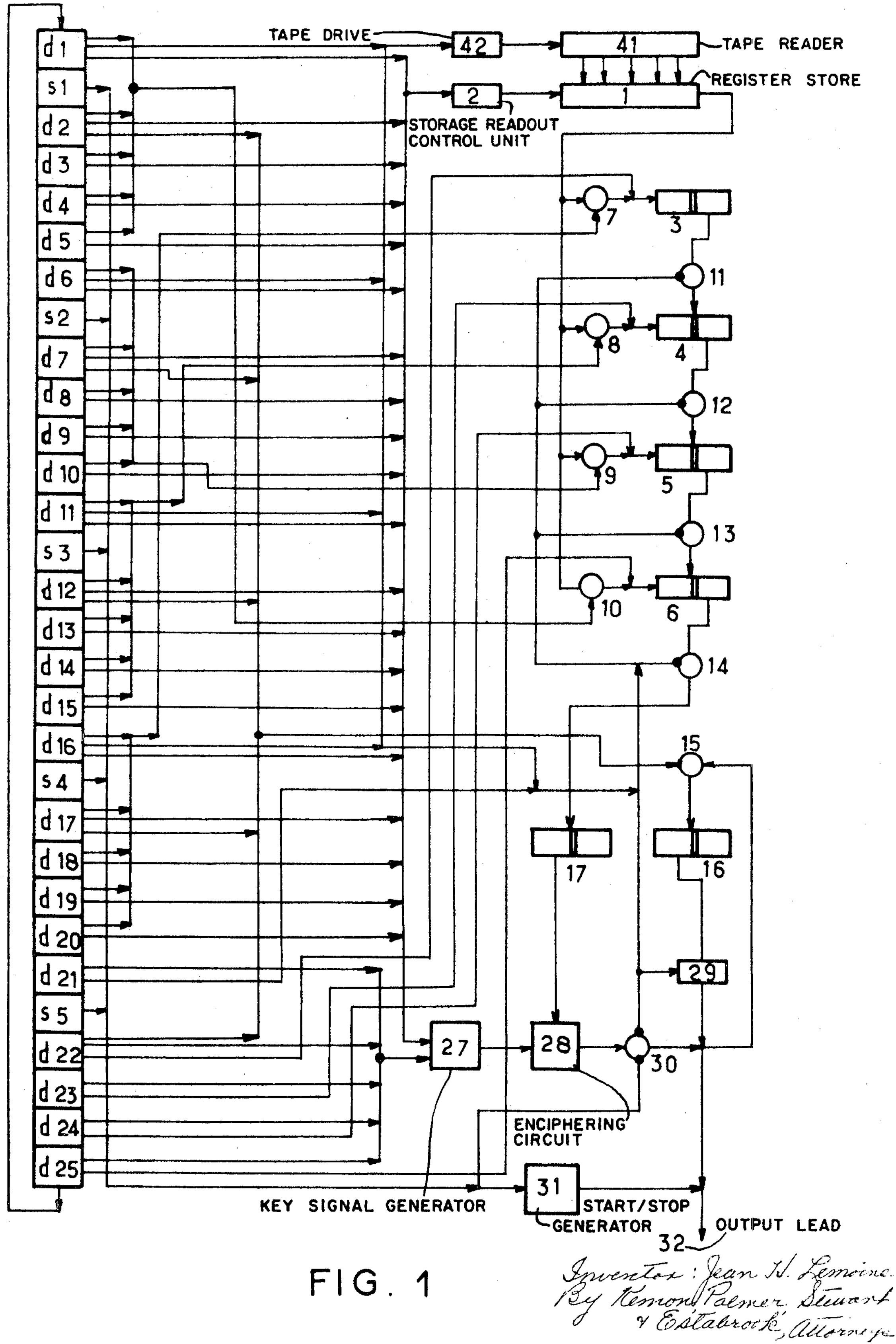

Inventor: Jean H. Lemoine
By Kemon Palmer Stewart & Estabrook, Attorneys

Inventor: Jean H. Lemoine
By Kenyon, Palmer, Stewart & Estabrook
Attorneys

BINARY CODED SIGNAL AND CIPHERING AND DECIPHERING METHOD AND SYSTEMS EMBODYING SAME

The present invention concerns improvements in or relating to ciphering systems for signals such as telegraphic or teleprinter signals which are encoded, character by character, with a predetermined and constant number of intelligence periods usually occurring between a start and a stop period for each group of such intelligence periods defining a character. For instance, for a five period telegraphic code, each intelligence period may be interpreted as being either of the binary value 0 or the binary value 1 (each intelligence period may present either a high voltage value or a low voltage value) so that each sequence of intelligence periods in a character may be considered as carrying a numerical quantity which lies between 0 and 32, i.e., ($2^5-1$).

The correspondence between the symbols of a group of such signals and the digital values as defined above, may be termed an "alphabet." Such an alphabet is standard for plain language communication and is usually defined by international rules; for instance, for the teleprinter plain language code, it is the International Telecommunication Consultative Committee which has determined the language:— for a five period teleprinter code, 32 characters are available, 26 of which represent "letters" and six of which are servicing signals respectively representing the following functions:— a signal for interpreting a character received as a letter, another signal for interpreting a character received as a number, a carriage return signal, a line change signal, a signal denoting a blank between words, and a signal which presently remains unused.

Enciphering such signals requires changing the alphabet for their transmission after the sending terminal equipment. Deciphering such signals at the remote end of the system requires a return to the plain alphabet from the ciphered one. In order to provide a high cryptographic security, it is specially desirable to have a large number of alphabets available so that the change of alphabets can be made quite arbitrary in the ciphering operations of the coded signals. An alphabet permutation program permits such an operation, said permutation program being available at both ends of a system, local and remote, and said program is of a pseudorandom character.

It has appeared useful, in such systems to have the capability to ensure a read-out of any ciphered signals at points intermediate the output of the enciphering equipment and the input of the deciphering equipment. It has further been considered desirable that such a read out can be made, character by character, under a purely alphabetical form (no digits, no punctuation signs, no servicing information). It is an object of this invention to provide a ciphering system which provides such desiderata in practical exploitation of the transmission systems of the kind defined above.

The invention is essentially based upon the two following statements:— first, it is necessary but sufficient for reading out only codes representing letters in the enciphered signals, that any code representing a servicing function is eliminated on the transmission path (but, of course, such servicing codes must be reconstituted at the remote end of the transmission path); secondly, in the standardized alphabets of plain language, the servicing codes all present a common distinctive characterization; for instance in the teleprinter five intelligence period code, all the servicing signals are made of codes wherein the first and last intelligence periods of which are identical, both said periods having either a value of either 0 or 1. If it were possible only to send on the trnasmission path, ciphered codes which do not present such a peculiarity, the read out at any point on said transmission path will result in codes of a purely alphabetic characterization.

It is also an object of the invention to provide a ciphering system eliminating from the ciphered language any signal presenting a servicing code characterization.

To this end the present invention provides an enciphering system wherein signals having a constant number of intelligence periods for each character, are not enciphered character by character, but on the other hand, group of characters by group of characters. The number of intelligence periods in each and any such group will be an integer multiple of both the number of intelligence periods in each character and a lower number thereof. Each group is enciphered by sequences of periods each comprising such a lower number of periods and, each time such a lower number of periods has been enciphered, such a lower number sequence is completed up to the normal number of intelligence periods of a character in the concerned alphabet by one or more periods additionally generated for conferring to the code of enciphered character finally issuing on the transmission path between the enciphering and the deciphering equipments in a characterization always distinct from that of a servicing code in the concerned alphabet. Of course, at the input of the deciphering equipment, these additional periods must be suppressed and the remaining periods re-contracted for a direct reconstitution of the normal characters which have been enciphered.

For instance, in the case of a five period code alphabet as herein before explained, after the enciphering of each four periods in a group of four characters, thereby comprising 20 intelligence periods, an additional code period is generated and issued from the enciphering equipment. Said additionally made fifth code period represents in binary numeration, the complement of the ciphered value of the first period in the concerned sequence of four. As in the language, each servicing signal cannot present such a characterization of having its first and fifth periods of distinct binary values, it is positively certain that on the transmission path, a read out will only give alphabetical codes. For the transmission of four normal characters, i.e., 20 intelligence periods, five characters, each having five intelligence periods will be transmitted between the output of the enciphering equipment and the input of the deciphering equipment of the system.

With such a system, it is obvious that the number of letters finally used in the enciphered path will be lower than 26 while being a multiple of two and preferably will be made equal to 16 which is the power of two of higher rank lower than 26. This does not present any inconvenience for the security of the cryptography proper.

An illustrative example will now be described in detail with reference to a five intelligence period code, with a group of characters four by four in the plain language for issuing five characters in ciphered language. The arrangements of an enciphering equipment and of a deciphering equipment for such a system according to the invention are respectively shown in FIGS. 1 and 2. Technological details are not shown since they are independent of the invention proper as also is the method of enciphering proper (key generating means, computing circuit for passing from plain to ciphered language and vice versa).

In the illustrated example, it is considered that the plain language message has already been recorded on a tape, readable character per character, as usual, and that said tape passes through a reader 41 which advances by one step each time a driving mechanism 42 is activated. Each step produces the read-out of one character on the tape and the five intelligence periods of said character are stored in a register store 1 from which the digits are recorded in parallel and read out in series. The digital values of the periods are read out from said store 1 under the control of a circuit 2 which controls the sequential output of the digits on a lead reaching the information inputs of four gates 7, 8, 9 and 10. Said gates are coupled to four one-digit stores such as 3, 4, 5 and 6, each store being a two-condition circuit as a flip-flop. From connecting gates 11, 12, 13, said four one-digit stores constitute a shift register controlled as will be herein after described. Each one-digit store is of the kind wherein the input of a digit ensures the erasing of the preceding content. The output of 6 is connected through a gate 14 to a further one-digit store 17 having the same arrangement as the stores 3 to 6.

One output from 17 is connected to an enciphering circuit 28 to which is coupled a key signal generator 27. As usual, the ciphering comprises combining of the plain language signal from 17 and the key signals from 27. The output of 28 is connected through a gate 30 to the transmission path 32 of the enciphered signals to the remote station. A start-stop signal generator 31 is also connected to said path 32, the control of which will be herein later defined. The output of gate 30 is further brought to a control input of a gate 15 the output of which is connected to the input of a one-digit store 16. The output of 16 is connected through a gate 29 to the output lead 32. It must be noted that the outputs from 17 and 16 are complementary. In other words, the output from 16 could be taken as that of 17 and the complementation to one could be provided in gate 29.

The control signals are formed from a recurrent time base comprising a looped cascasde of 30 stages for generating said signals, 25 of said stages are numbered from *d*1 to *d*25, and the remaining five stages are numbered from S1 to S5. The progression of the cascade is automatic in the sequence these stages appear in the drawing, from *d*1 to S1, from S1 to *d*2, and so forth. The stages *d*1 to *d*25 deliver signals useful to control the read-out of signals from the tape and the read-out of digits from the store 1. The signals S1 to S5 correspond to time intervals wherein the start-stop signal generator is activated Stage S1 is placed between *d*1 and *d*2, stage S2, between *d*6 and *d*7, stage S3 between *d*11 and *d*12, stage S4 between *d*16 and *d*17, and stage S5 between *d*21 and *d*22.

The control mechanism 42 of the tape reader 41 is controlled from a combination of the output signals from stages *d*1, *d6n* *d*11, *d*16. The read-out control member 2 for the register store 1 is controlled by a combination of the signals issuing from stages *d*1 to *d*20. The stepping of the key signal generator 27 is controlled in the first part from the said combination of the outputs of the stages *d*1 to *d*20 and on the second part from the combination of the outputs of the stages *d*21 to *d*25. The outputs of the stages S1 to S5 only control, as already stated, the start-stop signal generator 31, while inhibiting the gate 30 for the start-stop signal generation.

Gates 11 to 14 and gate 30 are inhibited by a combination of the output signals from stages *d*1, *d*6, *d*11, *d*16 and *d*21. Gate 29 is on the other hand unblocked by said combination of signals. Gate 15 is unblocked by the combination of the output signals from stages *d*2, *d*7, *d*12, *d*17 and *d*22. Gate 10 is unblocked by the combination of the output signals from the stages *d*1 to *d*5, gate 9 is unblocked by the combination of the output signals from the stages *d*6 to *d*10, gate 8 is unblocked by the combination of the output signals from the stages *d*11 to *d*15, and gate 7 is unblocked by the combination of the output signals from the stages *d*16 to *d*20.

The operation of the equipment of FIG. 1 may be explained as follows. The plain alphabet code periods will be denoted by *c*1, *c*2, *c*3, . . . *c*20. The ciphered code periods issuing from the equipment will be denoted by C1, C2, C3, . . . C20. The control stages are sequentially activated in the order in which they appear in the drawing from top to bottom.

During the activation of stage *d*1, the tape reader 41 progresses by one step and a five period code character is transferred to the store 1; the first period is immediately transferred through gate 10 into the one-digit store 6. Gate 14 is inhibited so that the prior content of 6 is not transmitted to the one-digit store 17 which contains the code period *c*20 of the preceding group of characters. On the other hand, gate 29 is unblocked and gate 30 is inhibited and consequently the output lead 32 receives a ciphered period which represents the complement value of C17 of said preceding group of characters which has been previously stored in 16.

During the activation of stage S1, the start-stop generator 31 feeds directly to lead 32, first a stop signal ending the preceding character, and second a start signal announcing the formation of a new character. Gate 30 is still inhibited.

During the activation of *d*2, intelligence period *c*2 is introduced into the store 6, wherein it is substituted for *c*1 which is transferred to 17 since gate 14 is unblocked. The value of *c*1 is converted into the ciphered value C1 which is fed to lead 32 and recorder through gate 15 in the one-digit store 16.

During the activation of *d*3, *c*3 is introduced into store 6 in substitution for *c*2 which is transferred to 17 so that the ciphered code period C2 is fed to lead 32, gate 30 being unblocked.

During the activation of *d*4, *c*3 is placed within 17 and the ciphered code period C3 is formed in 28 and fed to 32; simultaneously, *c*4 is introduced into 6.

During the activation of *d*5, *c*4 is transferred to 17 and consequently C4 is fed to lead 32; simulteneously, *c*5, is introduced into 6.

During the activation of *d*6, the tape reader progresses by one step and the storing register 1 receives the second character from the tape. The first code period *c*6 of said second character is placed within 5 through the gate 9 which is unblocked, gate 10 being inhibited, as well as gates 13 and 14. Gate 30 is inhibited but 29 is unblocked so that on lead 32 is applied an additional code period $\overline{C1}$, which is the one's complement of C1 and complete on said lead 32 the sending of a first five period character comprising the intelligence periods C1, C2, C3, C4 and $\overline{C1}$.

Thereafter S2 is activated and the generator 31 feed to the lead 32, first a stop signal and thereafter a start signal for a new character in the transmission path.

During the activation of *d*7, *c*7 is substituted to *c*6 in 5, *c*5 is transferred into 6 as a substitution for *c*5 which is fed into 17. Consequently *c*5 is ciphered in 28 into C5 which is fed to lead 32 and simultaneously is recorded in 16 since gate 15 is unblocked. C5 is consequently substituted for C1 in 16.

During the activation of *d*8, *c*8 is placed in 5, in substitution for *c*7 brought within 6 in substitution for *c*6 transferred to 17 and the ciphered code period C7 is consequently fed to 32.

During the activation of *d*9, *c*9 is placed in 5, in substitution for *c*8 which is transferred into 6 wherein it is substituted for *c*7 which is sent into 17 in substitution for *c*6. Consequently, the ciphered code period C7 is fed to 32.

Similarly during *d*10, *c*10 is placed in 5, *c*9 is transferred to 6 and *c*8 is transferred to 17 wherefrom C8 is fed to 32.

During the activation of *d*11, the tape reader progresses by one step to introduce the third character into 1, and the code period *c*11 is transferred into 4 through gate 8 which is now unblocked. Gates 12, 13, 14 are inhibited as is gate 30. On the other hand, the gate 29 is unblocked so that on 32 is fed the additional ciphered code period $\overline{C5}$ from 16. On lead 32 then the second ciphered character comprising the intelligence periods C5, C6, C7, C8 and $\overline{C5}$ has been fed. Thereafter during S3 are inserted on said lead 32 a stop signal period and a start signal period.

During the activation of *d*12, the code period *c*12 is placed into 4, *c*11 comes into 5, *c*10 into 6 and *c*9 into 17 so that the ciphered code period C9 is formed in 28 and fed to 32 and is simultaneously recorded into 16.

During the activation of *d*13, *c*13 is introduced into 4, and from the normal progression of the shift register, *c*10 is sent within 17 and consequently C10 is fed to 32. Similarly during the activation of *d*14, *c*14 comes into 4 and C11 is fed to 32. Similarly again during the activation of *d*15, *c*15 is introduced into 4 and the ciphered code period C12 is fed to 32. C14 is contained in 5, *c*13 in 6 and *c*12 in 7.

During the activation of *d*16, the fourth character is read out from the tape and introduced within 1, the first code period *c*16 of said fourth character is introduced into 3 as the gate 7 is then unblocked whereas 8, 9 and 10 are inhibited. The gates 11, 12, 13, 14 are inhibited as well as 30 but 29 is unblocked and on the lead 32 is fed the ciphered code period $\overline{C9}$ from 16. During the activation of S4, a stop period signal and a start period signal are fed to 32.

During the activation of *d*17, *c*17 is placed in 3, *c*16 in 4, *c*15 in 5, *c*14 in 6 and *c*13 in 17 so that the ciphered period C13 is fed to 32, and simultaneously recorded into 16.

During the following activations of *d*18 to *d*20, the same process repeats for feeding to 32 the ciphered periods C14, C15 and C16, while the plain alphabet periods progress up to *c*20 in 3, *c*19 in 4, *c*18 in 5, *c*17 in 6 and *c*16 in 17. The four plain alphabet characters having been read out from the tape, the tape reader does not receive any further advance signal up to the re-activation of *d*1. However, the stages *d*21, S5, *d*22, *d*23, *d*24 and *d*25 will ensure the remainder of the transmission on 32 as follows:

During the activation of *d*21, the transfer gates 11, 12, 13, 14 and 30 are blocked and the gate 29 is unblocked, so that the additional ciphered code period $\overline{C13}$ is fed to 32. During the activation of S5, the generator 31 sends a stop period and a start period signals on 32. The fourth ciphered character which has been fed to 32 comprises C13, C14, C15, C16 and $\overline{C13}$.

During the activation of *d*22, the shift register 3 to 6 progresses by one step so that *c*17 is introduced into 17 and the ciphered period C17 is fed to 32. During the activation of *d*23, one further step is made and C18 fed to 32. During the activation of *d*24, one more step is made and C19 is fed to 32. During the activation of *d*25, finally, *c*20 is brought into 17 and C20 is fed to 32. Thereafter, the control returns to *d*1 so that $\overline{C17}$ is fed to 32 and the first character of the next following group of characters is read out from the tape and the first code period thereof introduced in 6, as all the one-digit stores 3 to 6 have been progressively cleared out during the progression from *d*22 to *d*25. For such progression of the shift register, signals representing the binary digital value 0 are extracted from the time basis and applied to 3, 4, 5 and 6, in said numbering and progression, the connections relating thereto being shown on the drawing. When the shift register is of a kind wherein the progressions are controlled separately from the introduction of new digits therein, as was supposed to be the case, any time basis stage from *d*1 to *d*25 would have been used for such a control of progression, additional pulse outputs being then provided in said stages.

The key signal generator 27 is controlled each time for a progression thereof as the stages *d*1 to *d*25 have been sequentially activated. It is not imperative also to control said generator 27 from the stages enciphered to S5 but this may be obviously provided for if desired.

From the example just described, it is now apparent that for a group of four plain alphabet characters each of five intelligence periods, five characters, each having five intelligence periods have been sent on the transmission path to the remote end of the system, but each one of said five ciphered characters has a special presentation which distinguishes it from any servicing signal code. Each of the ciphered characters, when read between the terminal equipments on the line 32, will represent a letter the code of which comprises a first and a fifth periods complementary with respect to each other. Obviously then instead of using 26 letter codes, only 16 have been used in the ciphered transmission which, as said, is unimportant for the security of the ciphering since the key signal generator is a pseudo-random code generating circuit and it is this fact together with the computation in 28 of the ciphered signal from a key signal and a plain alphabet signal which ensures the secrecy and not the number of symbols used.

Instead of an arrangement as just described comprising a buffer shift register 3 to 6 with parallel inputs and series progression, it would have been feasible to couple to the tape reader 41 two registers each one having five storing stages, having each parallel and read-out/read-in arrangements, with a gate in each one of said parallel outputs and all the outputs of said gates connected to the input of stage 17. The first of said registers would receive the codes read out from the tape at the instants of activation of *d*1 and *d*11, the second, the codes read out from the tape at the instants *d*6 and *d*16. The first register would be cleared at the instants of activation *d*8 and *d*20 for instance, the second register at the instants of activation *d*14 and *d*1. The values of the code periods *c*1, *c*2, *c*3, *c*4, *c*5 would be transferred to 17 at the instants of activation *d*2, *d*3, *d*4, *d*6 and *d*7 from the first register; the values of the code periods *c*6, *c*7, *c*8, *c*9, *c*10 would be transferred to 17 from the second register at the instants of activation *d*8, *d*9, *d*10 *d*12 and *d*13; the values of the code periods *c*11, *c*12, *c*13, *c*14, *c*15 would be transferred to 17 from the first register at the instants of activation of *d*14, *d*15, *d*17, *d*18 and *d*19; the values of the code periods *c*16, *c*17, *c*18, *c*19 and *c*20 would be transferred to 17 at the instants of activation of *d*20, *d*22, *d*23, *d*24 and *d*25. The operation which has been explained would not be otherwise changed and the circuit diagram of such a modification is obvious per se. Other variations could be made in the diagram without departing from the spirit and scope of the invention.

With any variations of the diagram of FIG. 1 as well as with said arrangement proper, the message fed the lead 32 is as follows:— start - C1 - C2 - C3 - C4 - $\overline{\text{C1}}$ - stop — start - C5 - C6 - C7 - C8 - $\overline{\text{C5}}$ - stop — start - C9 - C10 - C11 - C12 - $\overline{\text{C9}}$ - stop — start - C13 - C14 - C15 - C16 - $\overline{\text{C13}}$ - stop — start - C17 - C18 - C19 - C20 - $\overline{\text{C17}}$ - stop, for each group of four characters read out from the tape.

At the remote end, it is necessary to eliminate at the input of the deciphering circuit all the start, stop and "bar" signals. This is easily obtained, FIG. 2, by means of a gate 62 inserted between the lead input 82 and a one-digit store 61 of the incoming periods, the output of which is connected to the ciphering circuit 28 coupled to the key signal generator 27. It must be understood that, conventionally, a ciphering circuit when used for unciphering signals is identical to the one used for enciphering.

It may be assumed for the sake of simplicity that the ciphered signals will arrive on 82 with the same relative instants with respect to the time base as they have been produced at the enciphering end of the system, so that the time base may be shown as identical to the one shown in FIG. 1. The gate 62 will be inhibited during the activations of stages *d*1, S1, *d*6*n* S2, *d*11, S3, *d*16, S4, *d*21 and S5. Each code period applied on 61 is immediately converted by the ciphering circuit 28 into an unciphered, consequently plain alphabet code period and said unciphered code period is transferred to the one-digit store 17 provided gate 14 is unblocked. In the receiving arrangement, said one-digit store 17 (a bistable member as shown) is the head of a shift register comprising the other one-digit bistable member store 18, 19, 20 and 21, with insertion of gates 22, 23, 24 and 25 between the stages of said shift register. The gates 14 and 22 to 25 are inhibited by the same combination of time basis signals as is the gate 62. The bistable members 17 to 21 are provided with outputs to further gates 34 to 38 respectively, so that a five period code may be read out in parallel relation therefrom, for recording it for instance on a tape the perforator of which is indicated at 51. The time instants to which such read out operations and recording operations are made *d*7, *d*13, *d*19 *d*25 (for instance for this last instant, which may as well be *d*1 or S1 if desired). Between the recordings, the perforator 51 must progress by one step and the stepping control member thereof, shown at 52, is controlled by a combination of signals *d*2, *d*9, *d*15 and *d*21 for instance. It may be any other combination of time instants intermediate between two recording operations for each of them).

Figure 2:
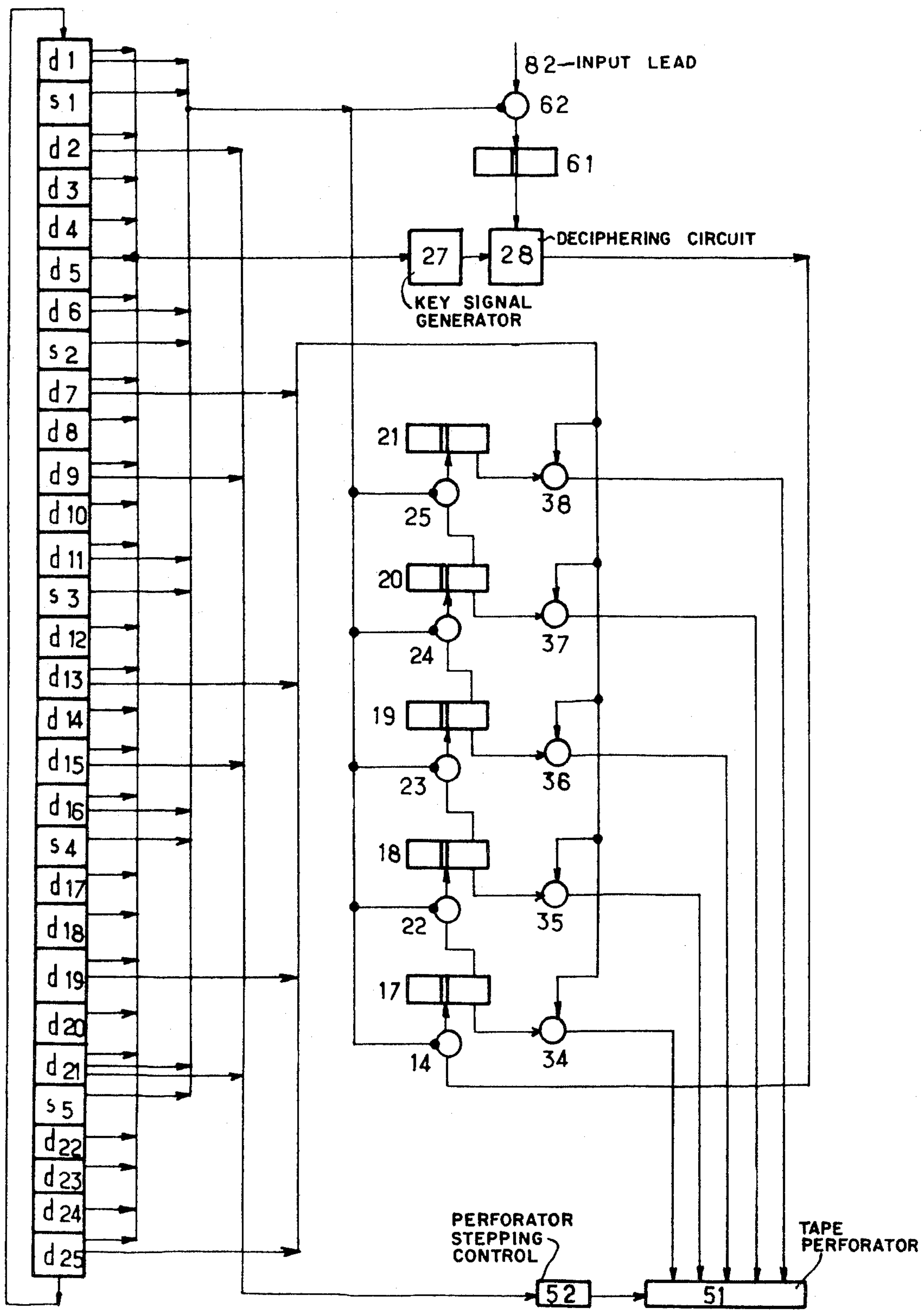

The operation of the scheme shown in FIG. 2 may be explained as follows:- during the activation of *d*1 and S1, nothing occurs since gate 62 is inhibited as well as gates 14 and 22 to 25. During the activation of *d*2, the enciphered code period C1 comes in through gate 62 unblocked, and is converted into the unciphered code period *c*1 introduced in 17 whereas the shift register progresses by one step for such introduction and the stages 18 to 21 after *d*2 contain the unciphered code periods *c*20 to *d*17 of the preceding group of characters. During the activations of *d*3, *d*4 and *d*5, the ciphered code periods C2, C3, C4 are received, converted into the unciphered code periods *c*2, *c*3 and *c*4 and introduced in the shift register. During *d*2, for instance as said, the control unit 52 has been activated for the one step progression of the perforator 51. During the activation of *d*6 as during the activation of S2, the shift register preserves its content, which is from 17 to 21, *c*4, *c*3, *c*2, *c*1 and *c*20 of the next preceding group of characters. During the activation of *d*7, C5 is received on 82 and the corresponding unciphered code period *c*5 is introduced into 17, the shift register progressing by one step so that said register now contains from 17 to 21, the periods *c*5 to *c*1. The gates 34 to 38 are unblocked so that this first reconstituted character is recorded by the perforator 51.

During the activations of *d*8, *d*9 and *d*10, the reception of the enciphered code periods C6, C7 and C8 ensures the restitution of the unciphered code periods *c*6, *c*7 and *c*8 and their introduction into the shift register. During the activation of *d*9, the perforator 51 has progressed by one step preparing the recording of the second character. During the activation of *d*11 and S3, the gates 62, 14 and 22 to 25 are inhibited. During the activation of *d*12 the ciphered code period C9 is received and consequently the unciphered code period *c*9 is formed and introduced in 17. During the activation of *d*13, the ciphered code period C10 is received, and consequently the unciphered code period *c*10 is formed and introduced in 17. The shift register contains *c*10, *c*9, *c*8, *c*7, *c*6, and said second character as thus reconstituted is recorded as the gates 34 to 38 are unblocked.

During the activations of *d*14 and *d*15, C11 and C12 are received, converted into *c*11 and introduced in the shift register. During the activation of *d*16 and S4, nothing occurs since gates 62, 14 and 22 to 25 are inhibited; the perforator progresses by one step during *d*15. During the activation of *d*17 and *d*18 C13 and C14 are received, converted into *c*13 and *c*14 and introduced within the shift register. During the activation of *d*19, C15 is received, converted into *c*15 and introduced in 17; the read-out of the contact of the shift register by the unblockng of the gates 34 to 38 occurs and the third character is perforated at 51, said third character comprising the code periods *c*15, *c*14, *c*13, *c*12*n* *c*11.

During the activation of *d*20, C16 is received, converted into *c*16 and introduced in 17. During the activation of *d*21 and S5, the transfer gates 62, 14, and 22 to 25 are inhibited. During the activation of *d*22, *d*23 and *d*24, the ciphered code periods C17, C18 and C19 are received, converted into $c17$, $c18$ and $c19$ and introduced in the shift register. During the activation of $d25$, the last code period C20 of the group is received, unciphered into $c20$, introduced in 17 and the content of the shift register is read out by the unblocking of the gates 34 to 38 to actuate 51 and record the fourth original plain alphabet character of the group, comprising the code periods $c20, c19, c18, c17$ and $c16$. The group of five transmitted characters has duly been converted for reconstituting the four original characters at the enciphering end of the system. The receiving equipment is ready for the reception of a next group of characters.

Instead of using a shift register 17 to 21, it would have been possible to use five separate one-digit store with a routing arrangement from 28 to said stores in order to memorize the unciphered code periods under the control of the time base signals, said group of five one-digit stores being read out in parallel and thereafter cleared for recording the next following five period values from 28. Even one of said five one-digit stores could be omitted since each five digit issuing from 28 could be routed directly to the recorder simultaneously to the read-out of the fourt preceding digits from said stores. The control may be easily and plainly deduced from the description of operation of the arangement shown, as concerns the time base instants for the control of a non-shiftable store.

The enciphering-deciphering process proper does not form a part of the invention and may be a matter of choice by the user. However, if one chooses an enciphering method utilizing not only the digital values of the key signals for combination with the character periods at any time instant, but also the memorized values of prior character periods, it may be useful to preserve the shift register (or equivalent storing means) 17 to 21 for enciphering as well as for unciphering, outputs from said one-digit stores being connected to suitable inputs of the ciphering unit 28.

What is claimed is:

1. A method for enciphering and deciphering binary coded signal representations of the characters of a plain language alphabet where a first definite number of intelligence periods are employed for representing the characters of the plain language alphabet and where the said character signals are transmitted with servicing signals, the latter named signals being characterized by a presentation common to all such signals, the improved method dispensing with the servicing signals on a transmission path linking transmitting and receiving ends of a transmission system and comprising the steps of:
   - grouping successive plain alphabet signals such that they may be enciphered in groups where each enciphered group comprises a second definite number of intelligence periods where said second definite number of periods is a submultiple of said first definite number of periods;
   - sequentially enciphering said groups of plain alphabet signals in a manner so as to produce said enciphering groups;
   - adding to each enciphered group a sufficient number of character identifying intelligence periods to bring the total number of intelligence periods in each said group up to said first definite number of periods and applying each so composed group to said transmission line;
   - canceling the character identifying intelligence periods at the receiving end of said transmission line;
   - deciphering the individual intelligence periods of said enciphered groups as they are received at the receiving end of the system such that they are reconstituted as intelligence periods of said plain language alphabet signals; and
   - regrouping the thus reconstituted intelligence periods in sequence so as to reconstitute the groups of plain language alphabet signals formed at the transmitting end of the system and applying the thus reconstituted groups of plain language alphabet signals to an output device.

2. Ciphering apparatus for use with a signal transmission system where the system includes a signal transmission end and a signal reception end and where signals to be transmitted are characterized as binary coded signals forming a plain language alphabet, each of the characters of said alphabet being comprised of a first definite number of signal intelligence periods, and as servicing signals, including
   - input means for applying said binary coded signals to said system and to said apparatus;
   - means operatively connected to said signal input means for sequentially enciphering said signals such that groups of enciphered character signals are formed, each group having a second definite number of intelligence periods which second number is less than said first number and is a multiple thereof;
   - means operatively connected to said input means and to said enciphering means for producing character identification intelligence periods and for adding a sufficient number of said identification periods to each enciphered group such that a character group having a number of intelligence periods equal to said first definite number is formed and applied to an output lead at said transmission end; and
   - means located at the signal reception end of said system for receiving said character groups, for eliminating said identification periods from said groups, for deciphering said enciphered groups, and for reconstituting said plain alphabet signals such that the characters of the alphabet are formed out of their first definite number of intelligence periods.

3. Ciphering apparatus according to claim 2 further including:
   - means connected to said signal input means and to said enciphering means for storing signals applied to said apparatus, the capacity of said storage means being equal to said first definite number of intelligence periods;
   - a time base having as many stages as the number of intelligence periods applied to said output lead;
   - means operatively connected to said enciphering means and to said time base and controlled by said time base for periodically interrupting the enciphering of said plain alphabet intelligence periods; and
   - wherein said means for producing character identification intelligence periods further includes means operatively connected to and under the control of said time base and connected to said output lead for applying said character identification intelligence periods to said output lead when said enciphering is interrupted.

4. Ciphering apparatus according to claim 2 wherein said means for producing character identification intelligence periods includes means for sequentially and periodically storing selected intelligence periods of said plain language alphabet and for performing a logical operation on said stored intelligence periods such that intelligence periods taken from the output of said storing means uniquely identify enciphered characters as distinguished from servicing signals when the said identification periods are added to said enciphered intelligence periods to form character groups.

5. Ciphering apparatus according to claim 2 further including a time base, and wherein the characters of said plain language alphabet signals each consist of five intelligence periods and wherein:

said enciphering means comprises means connected to said time base and controlled thereby for sequentially enciphering four of said plain language intelligence periods and for sequentially applying said thus enciphered intelligence periods to said output lead to thereby form a portion of said character group; and wherein said means for producing character identification periods comprises means for converting a plain language intelligence period from a selected one of said five periods into its complement;

said conversion means being connected to said time base and controlled thereby such that said means adds said complementary period to said four enciphered periods to complete the character group in such a manner that it is uniquely identified as a character group.

6. Ciphering apparatus according to claim 2 wherein said last named means comprises:

an input time controlled inhibiting means for eliminating said character identification periods from said character group;

deciphering means connected to said inhibiting means for sequentially deciphering enciphered intelligence periods;

intelligence period storage means operatively connected to said deciphering means for storing said deciphered periods, said storage means having a capacity to store said first definite number of intelligence periods;

means operatively connected to said deciphering means and to said storage means for controlling the application of deciphered periods to said storage means such that the characters of said plain alphabet are reconstituted sequentially in said storage means; and output means for reading out the contents of said store each time the storage means reaches full capacity.

* * * * *